US005244048A

United States Patent [19]

Moorhead, Sr.

[11] Patent Number: 5,244,048

[45] Date of Patent: Sep. 14, 1993

[54] DRILLING SYSTEM

[76] Inventor: Ethan W. Moorhead, Sr., 1330 W. 7th St., Hastings, Nebr. 68901

[21] Appl. No.: 560,803

[22] Filed: Jul. 31, 1990

[51] Int. Cl.[5] .......... B23B 45/14

[52] U.S. Cl. .......... 173/141; 408/136; 408/712

[58] Field of Search .......... 408/136, 712; 173/141, 173/36

[56] References Cited

U.S. PATENT DOCUMENTS

| | | | |
|---|---|---|---|
| 2,038,422 | 4/1936 | Decker | 408/136 |
| 2,477,916 | 8/1949 | Wilhide | 408/136 |
| 2,720,125 | 10/1955 | Palik | 408/136 |
| 2,810,308 | 10/1957 | Bodmer | 408/136 |
| 2,888,965 | 6/1959 | Phillips | 408/712 |
| 3,552,239 | 1/1971 | Yeaman et al. | 408/136 |
| 4,442,905 | 4/1984 | Agoston | 408/136 |
| 4,582,456 | 4/1986 | Imai | 408/136 |
| 4,810,137 | 3/1989 | Yang | 408/136 |

*Primary Examiner*—Frank T. Yost
*Assistant Examiner*—Scott A. Smith

[57] ABSTRACT

A drilling system for drilling upwardly under automobiles, and for drilling in a direction away from a drill base in other uses, having a base to which a post is attached. A drill carrier slides on the post. A collar is adjustable to anchoring positions along the post by means of a collar setscrew. A hand-lever pivoted to the drill carrier at one end has a mid-lever-fulcrum-axis at a pivotal attachment to the collar whereby a drill on the carrier moves away from the base when the post is vertical beneath an automobile and the other end of the lever is pulled downwardly in the direction of gravity-pull.

13 Claims, 1 Drawing Sheet

DRILLING SYSTEM

FIELD OF THE INVENTION

This invention is in the field of drills, each of which is for drilling in a direction away from a base. They differ from the common drill presses which drill toward the base.

BACKGROUND

In this field there has been a need for an up-drill pressing system which is economical, and durable and practical enough for mass sales for making mass production low prices possible. Part of the practicality must come from adaptation to a hand drill the buyer probably already has. But the remainder of the practicality must come from good operating characteristics and economy of construction.

Some patents have shown ways to drill away from a base: For example upwardly. Among these are Palik, U.S. Pat. No. 2,720,125 (1955), Baublitz, U.S. Pat. No. 2,879,677 (1959), Agoston, U.S. Pat. No. 4,442,905 (1984) and Yang, U.S. Pat. No. 4,810,137 (1989).

Of these, the Yang patent has no power-leverage system, using hand pressing on the drill housing itself with a brace limiting drilling depth.

The Baublitz patent has no drill carriage moving only up and down on a post, and a separate post-drill-carriage moving not up and down and sideways with respect to a post simultaneously, as would seem to cause the drill bit to move in an arc rather than straight.

The Palik patent has a feature making it unsuitable for use in up-drilling under cars. Its drill is directly on top of its post, good for many uses, but causing the height to be such that, at minimum height, it would seem too tall for the usual drilling upward under a car by a mechanic laying horizontally on one of the common castor wheeled back supports.

Operating economy is also important. Tilt-plates making bind-grip on a post, or shaft, are widely used in furniture clamps. They chew the shaft. Short use-life results, from shaft damage, and loss of grip, from wear on tilt-plates and shaft, makes inoperability in continued use. The post-gripping pawl, dog or tilt-plate of the Palik patent is, therefore, a disadvantage in continued use, economy being important to professional auto-mechanics.

There is no teaching in the Palik patent of removability of the base-mounted tube-post from the collar that carries the lower leverage-pivot, whereby the concept of replaceability of a base-attached tube-post with a shorter such post for under-car drilling, or a longer such post, for drilling one side wall of a room with the base against another side wall of the room, as in the invention hereof, is not taught. Replacement of an inner telescoping member with a longer or a shorter one is a concept not taught in the Palik patent either, but would appear possible at least for wall-to-wall drilling. But for under-car drilling the putting-in of a very short base-mounted post section is a concept, hereof, needed. Especially is it needed where the drill is on top of the post, but even then, the drill would not seem to be short enough to fit under a car.

A modifying of patented proposed up-drills by use of features from down-drills, could theoretically have been done many decades ago, but has been unobvious and hidden from the drill manufacturers, and the public has gone without these advantages for these many decades.

In the prior art background is the Mar. 31, 1959 U.S. Pat. No. 2,879,677 to Mr. M. H. Baublitz, titled: SUPPORTING OPERATING DEVICE FOR DRILLS AND THE LIKE. The device to U.S. Pat. No. 2,879,677 had the good features of hand-drill mounting, away-from-the-base-drilling, and transverse lever pressing. However, it had disadvantages and has never come into general usage in some main needs.

A major need for drilling away from a base is in drilling upwards under an automobile. A man holding a hand drill in such a position becomes tired very quickly as distinguished from other uses in which it is possible to drill downward or horizontally with a hand drill. The advantage for an auto mechanic would be in drilling away from a base rested on the ground or a work floor under a car with power because of the lever. The lever in U.S. Pat. No. 2,879,677 was designed to be pressed on by a foot, but it could have been put into position for hand operation under a car.

An objective hereof is to provide such a drill system with an easily adjusted total height, to fit under a car when needed and yet to be extendable by the addition of extension pipe sections until the base can even be disposed on the floor of a room while the drilling is being done at the ceiling of the same room.

Another objective is to provide economy by having a drill carriage slidable upon the same post that a lever pivot mounting is on. In U.S. Pat. No. 2,879,677 a drill carriage is not slidable on the base-post but pivots with respect thereto. This has a disadvantage of causing the drill bit to move in an arc rather than directly forward. It is an objective of this invention therefore to provide for the drill bit to move always in exact parallelism with the base-post in a sliding rather than a pivoting manner for a more precision drilling and for a lesser strain on drill bits. Hard steel drill bits are brittle and can break easy if not moved in direct alignment with the bit axis.

Another objective hereof is to provide a base-post formed of threaded pipe sections to be extendable with commonly available threaded pipe. This has a merchandising advantage because it is not necessary for a dealer to stock drilling systems of many sizes since the purchase of a drill base and basic base-post unit are sufficient to supply for many uses since threaded pipe of a desired length is easy to obtain in the popular diameters.

An objective is to provide a base with an attached coupler extending therethrough. The coupler is capable of threadedly receiving a base-post of any length.

Whereas the base-post U.S. Pat. No. 2,879,677 was square, it is an objective hereof to provide a cylindrical threaded base-post which can be extended by attaching another post section by means of a common pipe coupler additional to the coupler which is fixed to the base itself.

Another objective is to provide for attachment of a post extension into that side of the base-attached coupler which is on the opposite side of the base from the drill. This has the advantage of speed as compared with the disconnection of a primary base-post from the base in order to insert a secondary more extension base-post section. This speed is not detracted from by the absence of the base from the farthest end of the extension post section that has been attached to the backside of the base, because it has been discovered that one can just grasp a baseless backside extension as described, against some solid object and no base will be needed since the pressure of the object against the threaded end of such an extension does not cause the threads to become damaged as the pressure is only against the end and further has been discovered that the base itself although it is not resting against any solid surface can be easily used as a lever to be gripped by an operator's hand to prevent rotation of a base-post because of the rotation drilling floor.

Another objective here is to provide an inexpensive adjustable lever fulcruming system, adjustable by the same wing-bolt that serves as the lever pivot bolt as accomplished by a lock nut set against the lever with a desirable positioning so that the lever rotates freely but the lever is held into a pivot-plane without wobbling.

A U.S. Pat. No. 2,405,110 issued Jul. 31, 1945 to J. Bullock and titled: DRILL. It had the feature of adjustable length for a drill system that drilled away from a base but its extending was done by screws in the base-post section and not by threaded couplers. A greater versatility is achieved herein by the threaded coupler way because threaded pipe of many lengths is often available and can be purchased already threaded quite inexpensively.

In U.S. Pat. No. 2,405,110 the drill is supported with its bit in alignment with the base-post. This requires a drill holding cradle system adapted to fit one size of drill. It is an objective of this invention to provide a cradle system using divergent drill engaging surface which can engage drills with housings of many diameters and in a manner primarily engaging the drill between the two surfaces, and in which the two surfaces are not themselves each concave, as is the manner in the U.S. Pat. No. 2,879,677.

A chief objective hereof is to provide a drill system capable of use in many, many ways and yet which is inexpensive, and further in which, if a drill should fail and another of a differenct size is all that is available, the other drill can be substituted easily into the drill system hereof.

IN THE DRAWINGS

DESCRIPTION OF THE PREFERRED EMBODIMENT

Figure 1:
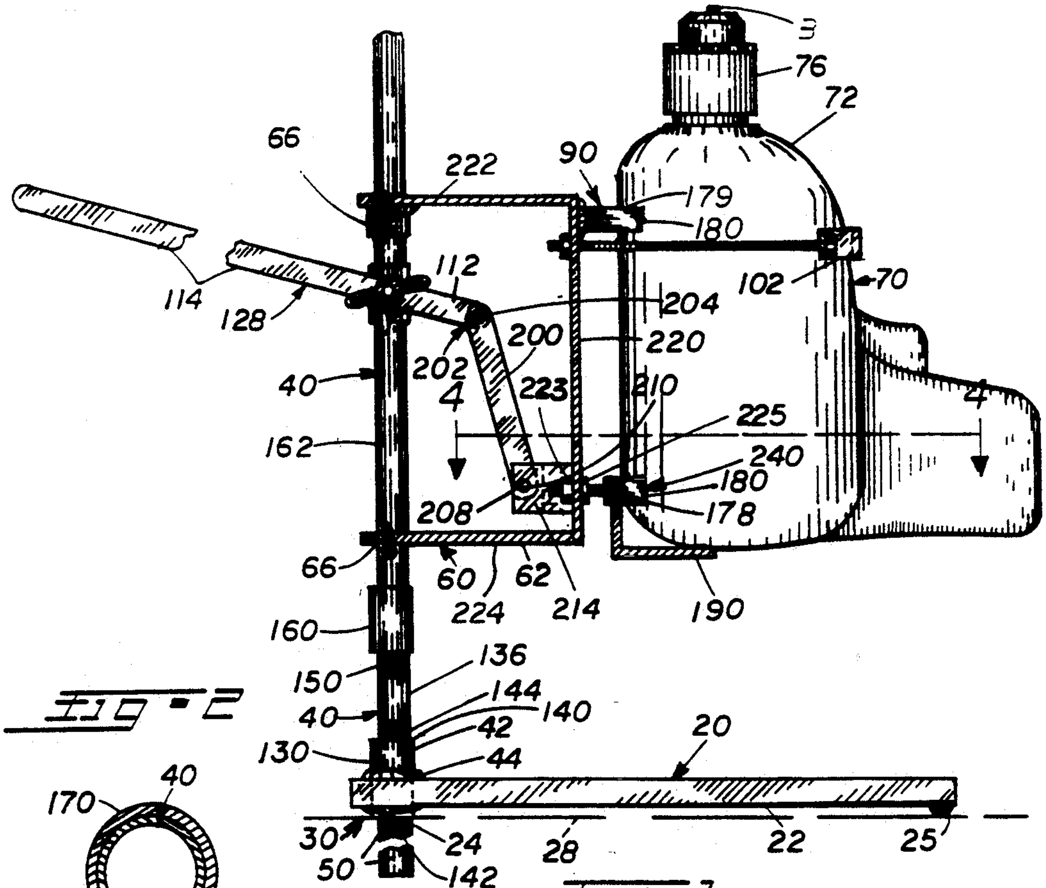
FIG. 1 is a side elevation of a drilling system hereof. Upper and lower parts of the hand-drill carriage are broken away to show openings therethrough slidably receiving the post.
Figure 2:
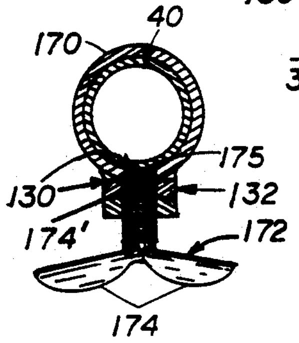
FIG. 2 is a sectional view taken along the line 2—2 in FIG. 1 with parts broken away.
Figure 3:
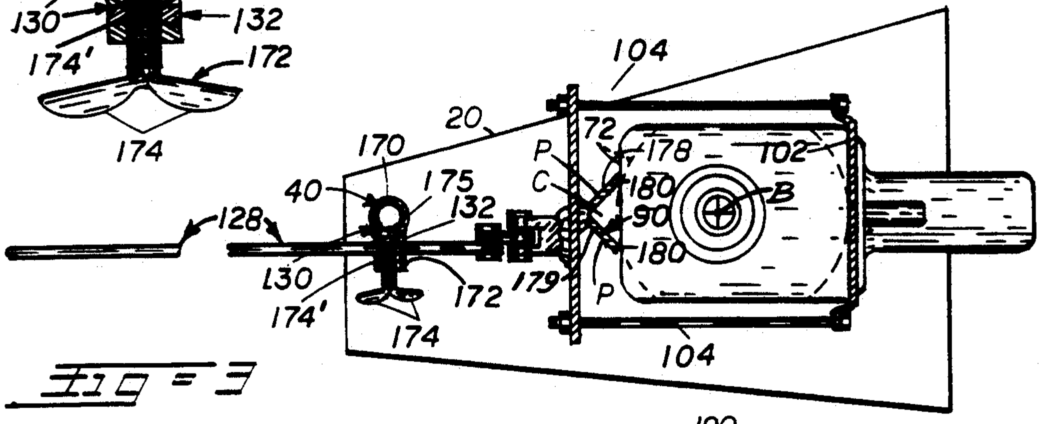
FIG. 3 is a sectional top plan view of the drilling system of FIG. 1 with an upper part of the drill carriage broken away. Dotted lines indicate the outlines of a housing of a different shape.
Figure 4:
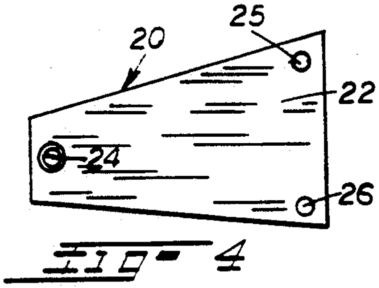
FIG. 4 is a bottom plan view of the base shown without a rearward side post extension.
Figure 5:
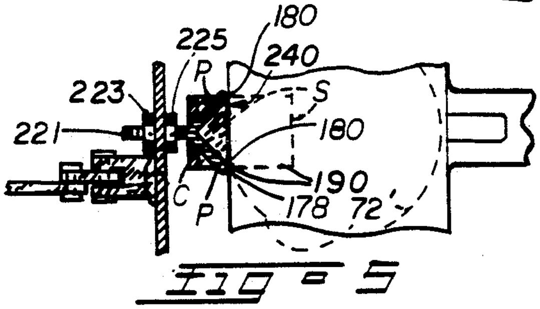
FIG. 5 is a sectional view taken along line 5—5 of FIG. 1.

The drilling system 10 of FIG. 1 has a base 20, having a bottom side 22, the outermost parts or points of which are seen at 24, 25, and 26 and lie substantially in the plane 28 resting against a planar support surface 30.

A post 40 is attached by a coupler 42 and welding 44 to the base 20. The post 40 extends along an axis 50 disposed at a right angle to the plane 28.

A drill carriage 60 has a main portion 62 having two openings 66 therethrough slidably receiving the post 40. A hand drill 70, having a housing 72, and has a drill chuck 76 on its end disposed farthest from the base 20.

A first cradle 90, attached to the main portion 62 of the drill carriage 60 engages one side of the drill housing 72. A second cradle 102 engages an opposite side of the drill housing 72. Drawbolts 104 draw the first and second cradles 90 and 102 toward each other clamping the drill housing 72 therebetween.

A hand lever 128, has one end 112 pivotally attached to the carriage 60 and having an opposite end 114 for a handle. The lever 128 pivots on a pivot axle 130. An axle mounting assembly 132 mounts the pivot axle 130 on the post 40 in an adjustable manner whereby the axle 130 can be disposed selectively at various positions along the post 40. So when the handle end 114 of the lever 128 is moved in each of two directions, the carriage 60 and the drill 132 will be moved in directions: forward for drilling and rearward for drill removal, each direction being parallel to the post axis 50.

The post 40 has a first section 136 which is threaded at its end nearest to the base 20. The base 20 has a portion 130 thereof which provides a first threaded socket 140 receiving a threaded lower end 144 of the first post section 136 and attaching the first section 136 to the base 20.

A second threaded socket 142 is mounted on said base 20 and extends along the axis 50 on the opposite side of the base 20 from the first post section of the post 40.

A coupler 42 extends through the main base portion 22 and is welded at 44 to the main base portion 22 of the base 20 with a portion of the coupler 42 on each side of the main base portion 22 whereby the coupler 42 provides the first and second sockets 140 and 142.

The first post section 136 has outer splice-threads 150 on the end thereof which is farthest from the base 20 whereby an outer splice-coupler 160 can be placed on the outer splice-threads 150 for reception of another post-section 162 in the outer splice-coupler 160.

The axle mounting assembly 132 has a collar 170 surrounding and slidably received on the post 40. A lockbolt 174 which can be a wingbolt with wings has a shank 130 which is the axle 130 extending through the collar 170 and engageable with the post 40. A nut 174, fixed to the collar 170, threadedly mounts the lockbolt 174 on the collar 170 whereby rotation of the lockbolt 174 can cause the collar to be fixed in a desired position on the post.

A lock-nut 172 on the lockbolt shank 175 holds the lever 128 in a position for freely pivoting substantially in a single plane about the axle or shank 175.

The first drill housing cradle 90 has closer and farther housing engaging assemblies 178 and 179 disposed respectively closer to and farther from the base 20.

Each of the closer and farther assemblies 178 and 179 have a pair of surfaces 180 for engaging the drill housing 72 on a first side thereof. The closest and farther housing engaging assemblies 178 and 179 each have a pair of protrusions P with a deep cavity C therebetween.

The drill housing engaging surfaces 180 are at outer terminal ends of the protrusions P respectively. One of the closer and farther engaging assemblies 178 and 179 and specifically the closer one 178, is in a manner for adjustability of its spacing with respect to the post axis 50 for making possible the alignment of a drill bit B in the hand drill 70 so that the drill bit B is in parallelism with the post axis 50. The closer drill housing assembly 178 is provided with a backup surface S adapted to engage that side of said drill housing 72 which is closest to the base 20 whereby the drill housing 72 can be pressed toward a work piece, not shown, but disposed on the side of the hand drill 70 which is the farthest from the base 20.

The drill carriage 60 has a vertical plate 220 mounted on arms 222 and 224. The closer drill housing engaging assembly 178 has its protrusions P connected to a threaded assembly 178 has its protrusions P connected to a threaded shaft 221 which extends freely through the vertical plate 220.

In FIG. 1, the shaft 221 has a pair of nuts 223 and 225 on opposite sides of the plate 220 for holding a selected adjusted position of the closer engaging assembly 178, for holding a desired hand drill 70 in position.

As seen in FIG. 1 the end 112 of the lever 128 pivotally connected to a link 200 by a bolt 202 for rotation about a second lever axis 204.

The link 200 is pivotally attached by a bolt 210 to an ear 214 for rotation about link axis 210.

The ear 214 is fixed to that side of the vertical plate 220 which faces the post 40.

In operation, pressing down on the lever 128 at its handle 114 will cause the carriage 60 to slide upwardly on the post 40 and the drill to move toward a work piece, not shown.

I claim:

1. A drilling system comprising a base, said base having a side, said side having outermost parts which lie substantially in a plane for resting against a planar support surface, a post, means attaching said post to said base, said post extending along an axis at a right angle to said plane, a drill carriage having a main portion having two openings therethrough slidably receiving said post, a hand drill having a housing and having a housing and having a drill chuck on its end disposed farthest from said base, a first housing cradle on said main portion of said drill carriage and engaging one side of said drill housing, a second housing cradle engaging an opposite side of said drill housing, means drawing said first and second housing cradles toward each other for clamping said drill housing therebetween, A hand lever, means pivotally attaching one end of said lever to said carriage, said lever having an opposite end serving as a handle end, a lever mounting means, said lever mounting means comprising a post-engager for engaging one side of said post, said lever mounting means having a set-screw means threadedly mounted in said post-engager and pressing against an opposite side of said post, said lever mounting means serving as a fulcrum to pivotally mount an intermediate part of said lever onto said post, said part of said lever being substantially spaced from said ends of said lever and being spaced farther from said handle end than from said one end of said lever, said set-screw and said lever mounting means being disposable selectively at various positions along said post, said system being capable of operating such that when said handle end of said lever is moved toward said base, said carriage and said drill will be moved in parallelism with said post-axis away from said base.

2. The system of claim 1 having said cradles each having two drill housing engaging surfaces spaced apart in a direction transverse to said post axis with an open space between said drill housing engaging surfaces for receiving a part of said drill housing, said two surfaces of each cradle being spaced at a first distance much lesser than the greatest distance across said drill housing in a direction transverse to said post axis, so as to fit other drill housings of other sizes.

3. The drilling system of claim 2 having said post being threaded at its end nearest said base for defining post attachment threads.

4. The drilling system of claim 3 having said means attaching said post to said base comprising a piece of pipe defining a post extension, a post extension coupler threadedly connecting said post extension to said post.

5. The drilling system of claim 4 having said drill carriage having an attachment portion horizontally spaced from said post, pulling means connected pivotally to said one end of said lever and pivotally connected to said carriage attachment portion for pulling upwardly on said drill carriage.

6. The drilling system of claim 5 having said pulling means connection to said carriage being disposed opposite a place along said post that is between said two carriage openings.

7. The system of claim 6 having said means attaching said post to said base comprising a coupler.

8. The system of claim 7 having rest means protruding from the other side of said base from said post and having three spaced legs, outer ends of said legs being in a horizontal plane when said post-axis is vertical.

9. The system of claim 8 having said coupler protruding on said other side of said base and defining one of said legs.

10. The drilling system of claim 1 having said post being threaded at its end nearest said base for defining post attachment threads.

11. The drilling system of claim 10 having said means attaching said post to said base comprising a piece of pipe defining a post extension, a post extension coupler threadedly connecting said post extension to said post.

12. The drilling system of claim 11 having said drill carriage having an attachment portion horizontally spaced from said post, pulling means connected pivotally to said one end of said lever and pivotally connected to said carriage attachment portion for pulling upwardly on said drill carriage.

13. The drilling system of claim 12 having said pulling means connection to said carriage being disposed opposite a place along said post that is between said two carriage openings.

* * * * *